United States Patent [19]
Vandierendonck

[11] Patent Number: 4,503,511
[45] Date of Patent: * Mar. 5, 1985

[54] COMPUTING SYSTEM WITH MULTIFUNCTIONAL ARITHMETIC LOGIC UNIT IN SINGLE INTEGRATED CIRCUIT

[75] Inventor: Jerry L. Vandierendonck, Houston, Tex.

[73] Assignee: Texas Instruments Incorporated, Dallas, Tex.

[*] Notice: The portion of the term of this patent subsequent to Sep. 30, 1997 has been disclaimed.

[21] Appl. No.: 397,720

[22] Filed: Jul. 13, 1982

Related U.S. Application Data

[63] Continuation of Ser. No. 192,387, Sep. 30, 1980, abandoned, which is a continuation of Ser. No. 815,871, Jul. 14, 1977, Pat. No. 4,225,934, which is a continuation of Ser. No. 176,664, Aug. 31, 1971, Pat. No. 4,037,094.

[51] Int. Cl.³ .............................................. G06F 7/50
[52] U.S. Cl. ................................................... 364/716
[58] Field of Search ........................................ 364/716

[56] References Cited

U.S. PATENT DOCUMENTS

| | | | |
|---|---|---|---|
| 3,231,725 | 1/1966 | Davis et al. | 364/738 |
| 3,427,445 | 2/1969 | Dailey | 364/712 |
| 3,454,310 | 7/1969 | Wilhelm, Jr. | 328/92 |
| 3,576,984 | 5/1971 | Gregg, Jr. | 364/716 |
| 3,584,207 | 6/1971 | Huddinge et al. | 364/716 |
| 3,596,074 | 7/1971 | Mitrofanoff | 364/716 |
| 3,596,075 | 7/1971 | Weelden | 364/716 |
| 3,800,129 | 3/1974 | Umstattd | 364/712 |
| 4,225,934 | 9/1980 | Vandierendonck | 364/716 |

OTHER PUBLICATIONS

Petritz, "Technological Foundations and Future Directions of Large-Scale Integrated Electronics" *Proceeding-Fall Joint Computer Conference*, 1966, p. 65.

Sack et al., "Evolution of the Concept of a Computer on a Slice" *Proceedings of the IEEE*, 1964, pp. 1713–1714.

"CPU Chip Turns Terminal into Stand-Alone Machine" *Electronics* Jun. 7, 1971.

van Barneveld "'Large-Scale Integration' in MOS--technieken" *De Ingenieur*, Jul. 9, 1971, pp. 94–97.

Hoff, Jr. "Impact of LSI on Future Minicomputers" 1970 *IEEE International Convention Digest*, Mar. 1970, pp. 284–285.

Lucas, "An Accumulator Chip" *IEEE Trans. on Computers*, vol. C-18, No. 2, Feb. 1969, pp. 105–114.

"Calculator-on-a-Chip"-NOW! *Electronic Products* magazine, Mar. 1, 1971, p. 42.

*Primary Examiner*—David H. Malzahn
*Attorney, Agent, or Firm*—John G. Graham

[57] ABSTRACT

A computing system includes a central processor unit (CPU) in combination with external memory units. The CPU includes an arithmetic logic (ALU), an instruction register, a random access memory, and a control system for interconnecting the functional elements of the CPU via sequential use of a common parallel buss, enabling the CPU to be defined on a single chip. The ALU is capable of performing eight separate arithmetic and logic functions utilizing common logic gates.

19 Claims, 7 Drawing Figures

COMPUTING SYSTEM WITH MULTIFUNCTIONAL ARITHMETIC LOGIC UNIT IN SINGLE INTEGRATED CIRCUIT

This is a continuation of application Ser. No. 192,387, filed Sept. 30, 1980 (now abandoned), which was a continuation of application Ser. No. 815,871, filed July 14, 1977, now U.S. Pat. No. 4,225,934, which was a continuation of application Ser. No. 176,664, filed Aug. 31, 1971, now U.S. Pat. No. 4,037,094.

This invention relates the computing systems in general and more particularly to an ALU that utilizes common insulated-gate-field-effect-transistor logic gates to effect eight separate functions.

Numerous combinations of CPUs and external memory are available in industry, respectively offering a variety of advantages such as size, speed, cost, etc. Recently it has become particularly advantageous, especially from a cost viewpoint, to utilize a memory circuit that includes predominantly insulated-gate-field-effect-transistor devices. For most applications the memory must be compatible with transistor-transistor-logic (TTL) circuits. Problems typically associated with such a memory system relate to speed of operation, flexibility of use, and general size, it being desirable to reduce the area of semiconductor material required for the systems. From a fabrication and reliability viewpoint, it is desirable to minimize the number of external interconnections between various chips in the system.

One area of computing systems that typically requires a relatively large area of chip is the ALU. Conventionally, the various arithmetic and logic functions that can be performed by a CPU are performed by separate complex logic circuits. Such circuits require a large area and limit speed of operation of the CPU.

Accordingly, an object of the present invention is to provide an improved computing system.

An additional object of the invention is to provide an ALU that shares common logic to perform separate logic and arithmetic operations.

In accordance with the present invention, the ALU of a central processor for use in a computing system includes a common logic circuit for performing arithmetic operations. In the preferred embodiment, the ALU performs eight functions, add, add with carry, subtract, subtract with borrow, AND, OR EXCLUSIVE OR, and COMPARE. Three bits of an instruction are coded to define the desired operation. A decode circuit receives these three inputs and provides a set of output control signals to the logic circuit. The logic circuit includes a complex logic OR-AND NOT gate for inverting the subtrahend in subtraction operations, a logic NAND gate for performing an AND function and for forming a carry generate signal for add and subtract operations; a first logic gate corresponding to the inverse of an EXCLUSIVE OR for performing an EXCLUSIVE OR operation and for providing the carry propagate term for add and subtract operations; a NAND logic gate for controlling the outputs of the OR and AND functions; a second logic gate corresponding to the inverse of an EXCLUSIVE OR for controlling the output of the operation exclusive or and for forming the sum output of one bit of the ALU; and a carry circuit for generating a carry within a bit and for propagating a carry between bits for addition, subtraction and compare operations.

The ALU circuit offers the advantages of reduced number of gates for performing the arithmetic and logic operations with a corresponding reduction in size and increase in speed of operation.

Additional objects and advantages of the invention will be apparent upon reading the following detailed description of an illustrative embodiment of the invention in a computing system in combination with the drawings, wherein:

The Figure numbers are not consecutive; my earlier U.S. Pat. No. 4,037,094 is incorporated herein by reference, and text and Figures of this application have been omitted, but the original Figure numbers are maintained to avoid confusion;

FIG. 24 is a logic diagram illustrating the logic of exclusive OR.

The present invention is directed to a central processing unit (CPU) integrated on a single chip in combination with external RAM and ROM memory units. The invention is described hereinafter and in my patent 4,037,094 first as it functions as a system. The functional units of the CPU are described. This description will include definition of the instruction set that may be utilized in conjunction with the CPU. For purpose of explanation, the CPU is functionally described as comprising a sequence and control logic unit, an arithmetic logic unit, and a CPU random access memory. These functional elements are interconnected by an 8-bit parallel bus. The various logic circuits associated with the sequence and control logic, the arithmetic logic unit, and the internal RAM, are described in detail, along with illustrative examples of operations for specific examples. Finally, the interface logic for interconnecting the CPU with the external memory are described.

SYSTEM DESCRIPTION

Figure 1:
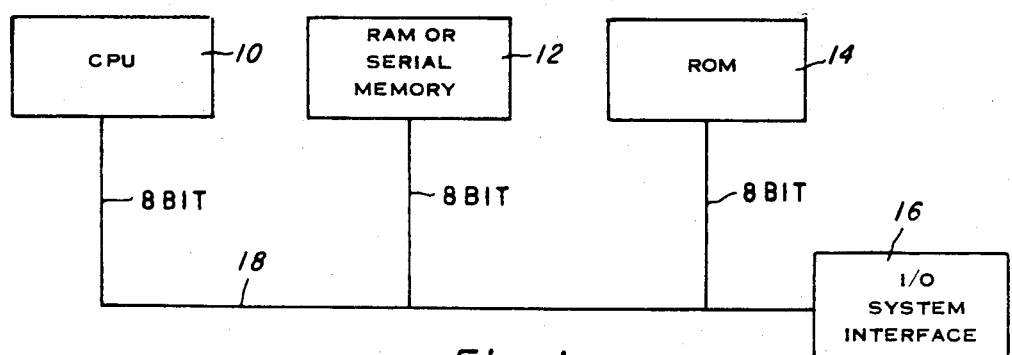
FIG. 1 is a functional block diagram illustrating a single chip central processing unit interconnected with external memory systems.

FIG. 1 illustrates in block diagram format a central processing unit 10, an external memory unit 12, and a read-only memory 14. These three units 10, 12, and 14 are interconnected by a common eight-bit parallel bus 18. An input/output system interface is indicated generally by block 16. This interface system enables external inputs and outputs to and from the CPU and memory unit 12.

In accordance with the present invention, the CPU 10 is integrated on a single chip. This has the advantage in that it enables fast execution time and a minimum number of leads necessary for interconnect to other elements of a computing system. The external memory 12 may be either a random access memory or a serial memory. As will be explained hereinafter with reference to the detailed description of FIG. 37, which physically appears in U.S. Pat. No. 4,037,094, the logic of the external memory is designed so that either random access memory or a shift register type memory may be utilized.

The read-only memory (ROM) 14 is used in the system to store fixed subroutines or control programs. The CPU 10, memory 12, and read-only memory 14 are interconnected with each other and with the input/output interface 16 by a common eight-bit parallel bus 18. On one phase of the clock, the CPU or memory will output data; on the other phase of the clock, the CPU and memory will accept an input.

CPU ORGANIZATION

Figure 2:
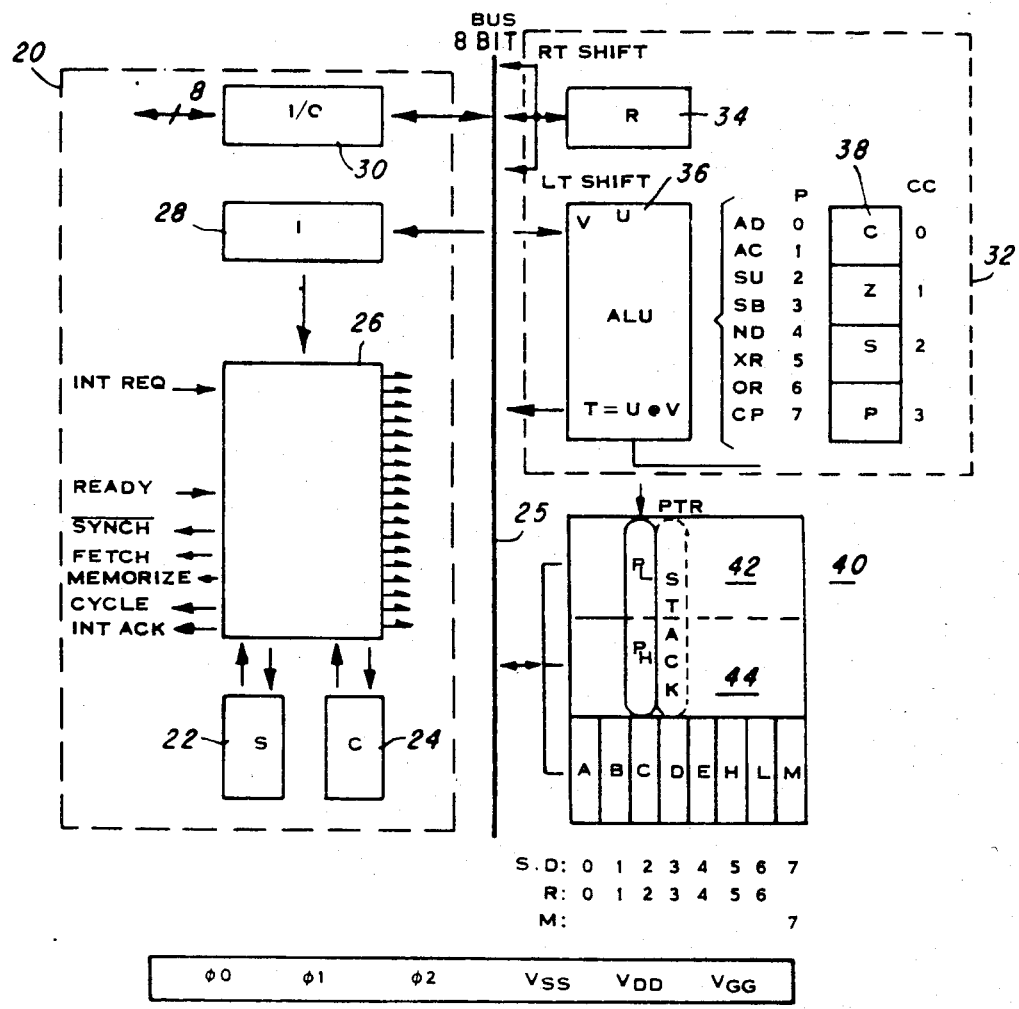
FIG. 2 is a functional block diagram of a one chip CPU which may be used in accordance with the present invention.

FIG. 2 is a functional block diagram of the CPU organization. The CPU consists basically of three blocks, the control decode 20, the ALU 32, and the internal RAM 40. The control section 20 controls CPU operation and synchronization such that communications between various blocks of the CPU may occur over the common eight-bit bus 25. The control section 20 includes a control decoder 26. This block has as inputs an interrupt request (INT REQ) and a ready (READY) signal. Outputs of the control decoder 26 include a $\overline{\text{SYNCH}}$, FETCH, CYCLE, interrupt acknowledge (INT ACK), and MEMORIZE signals. A master system timer 22, and a cycle timer 24 (which enables variable instruction lengths) are connected to the control decode block 26. An instruction register 28 also inputs information into the control decoder 26. The control decoder has 18 outputs which control the internal RAM, the ALU, and the system interface and external memory units. An input/output block 30 forms a part of the control section 20 and is interconnected to the internal bus 25. The detailed logic circuits associated with the various blocks of the control section 20 are described with reference to FIGS. 8–15 of my U.S. Pat. No. 4,037,049, which is incorporated herein by reference.

Block 32 generally depicts the ALU section of the CPU. The arithmetic logic unit includes a temporary storage register 34 which contains the shift right and shift left circuits. Block 36 refers generally to an eight-bit arithmetic unit. This unit can execute eight different functions, add, add with carry, subtract, subtract with borrow, AND, EXCLUSIVE OR, OR, and compare. A code P corresponds to each of these arithmetic operations. As will be explained hereinafter with reference to the instruction set of the CPU, bits 5, 4, 3 of the instruction register contain binary information corresponding to these arithmetic operations. By way of example, subtract with borrow has a code P equal to 3. This would be a binary code of 011.

Block 38 represents the four arithmetic flags which indicate the status of data of an arithmetic operation. As may be seen, the four flags are carry (C), zero (Z), sign (S), and parity (P). The condition code (cc) corresponding to each of these condition flags is shown as 0, 1, 2, and 3, respectively. As understood by those skilled in the art, two bits of binary data may be used to uniquely select one of the four flags. The condition flag codes, and also the arithmetic operation codes P are shown in Table V of U.S. Pat. No. 4,037,094.

The internal RAM of the CPU is shown generally at 40. This RAM contains 26 eight-bit registers. Two of these registers are selected for program address. These two registers are indicated at 42 and 44, corresponding to the low order address bits ($P_L$) and the high order address bits ($P_H$) respectively. In combination, these two registers enable absolute 16-bit addressing of a location in memory. Using 16-bit memory addressing, it is possible to address up to 64K bytes of data in memory. The RAM also contains data register A, B, C, D, E, H, L, and M'. Data register A is used as the accumulator. Registers, B, C, D, and E are general purpose registers, and registers H and L are combined and contain the location of memory address. Data register M' is used internally only. Fourteen of the data registers in the internal RAM define a seven-level last-in-first-out stack (STACK). This has the advantage in that it facilitates calling subroutines.

The detailed logic associated with the arithmetic unit 32 is described in detail with reference to FIGS. 16 through 24 of U.S. Pat. No. 4,037,094. The detailed logic circuits associated with the internal RAM 40 is explained with reference to FIGS. 25 through 29 of U.S. Pat. No. 4,037,094.

As will be explained hereinafter with respect to the instruction set of the CPU, one of the data registers, A, C, B, C, E, H, or L of the internal RAM 40 may be selected by source or destination codes in the instruction. Three bits of data are required to select one of the registers as a source or destination register. For example, to select register D, a binary coding of 011 (3) would be required. As mentioned previously, the data register M' is used only for internal operation of the CPU. Thus, a coding of seven; that is binary 111, is used in the present invention to refer to external memory.

Figure 5:
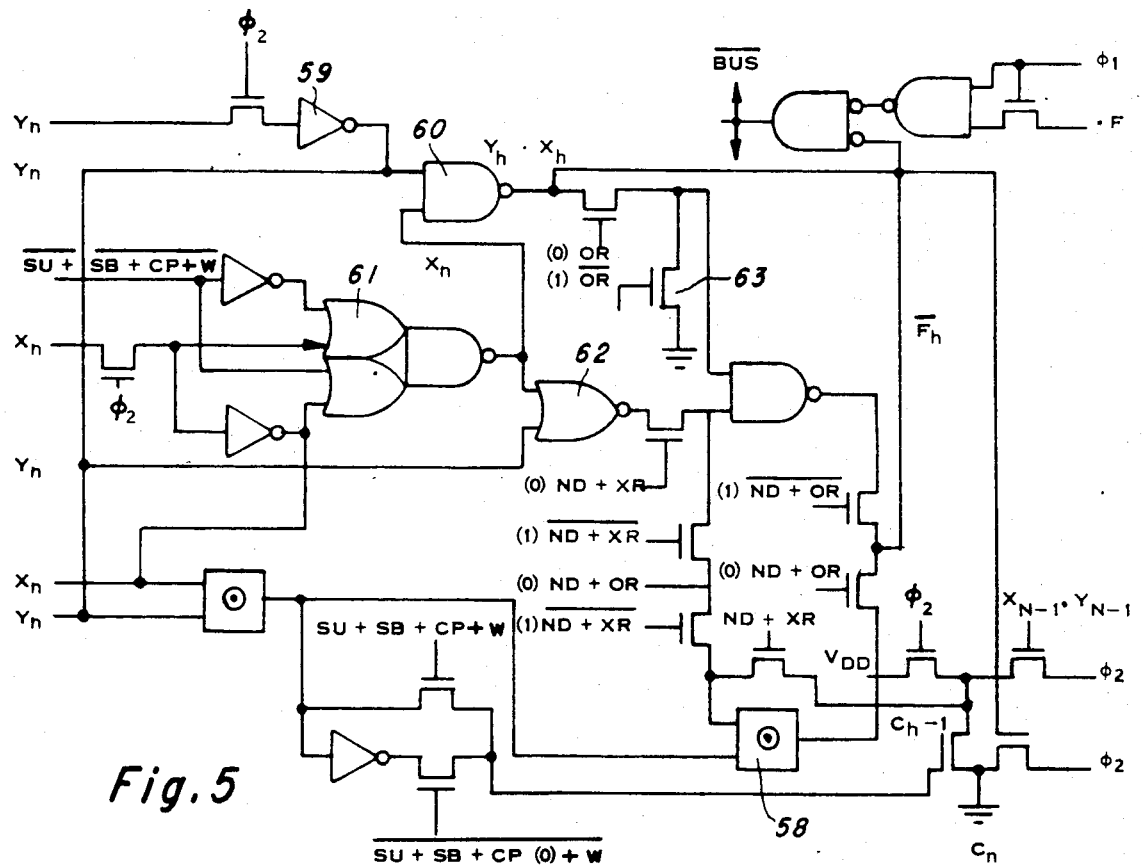
FIG. 5 is a logic diagram of one bit of the arithmetic logic unit of the single chip central processing unit of the present invention.

One bit of the arithmetic unit 32 is illustrated in FIG. 5. The arithmetic unit comprises inverters, shown generally at 59, NAND gates 60, NOR gates 62, complex gates 61, exclusive OR gates 58, and MOS transfer gates 63, interconnected in such a manner that in response to selected control signals, eight separate arithmetic operations may be executed. Operation of the logic to effect arithmetic operations add, subtract, and exclusive OR is described in the detailed description of FIGS. 22, 23, and 24, respectively, of my U.S. Pat. No. 4,037,094, incorporated herein by reference.

ARITHMETIC UNIT

Figure 19:
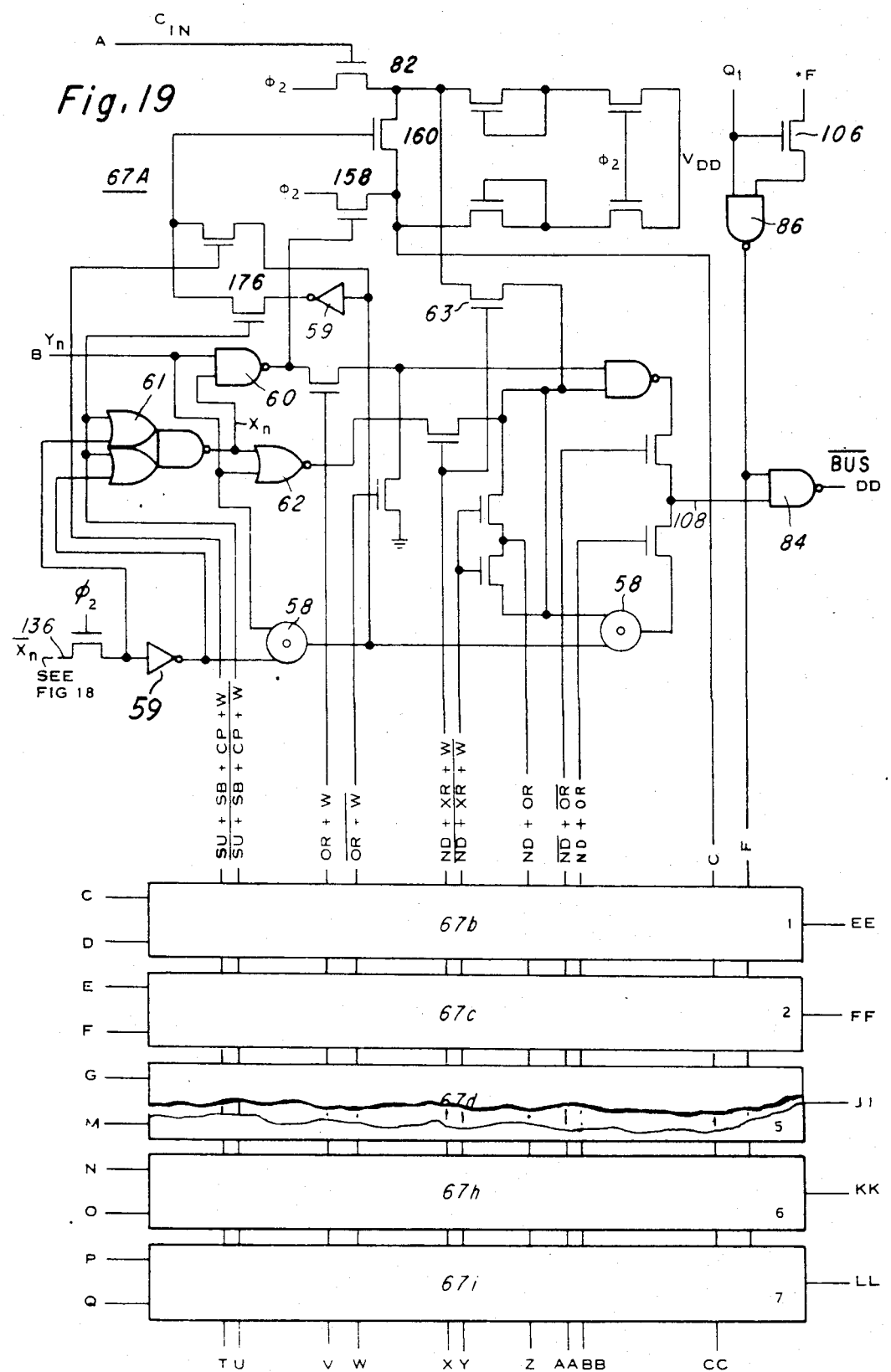
FIG. 19 is a logic diagram of the arithmetic unit.
Figure 22:
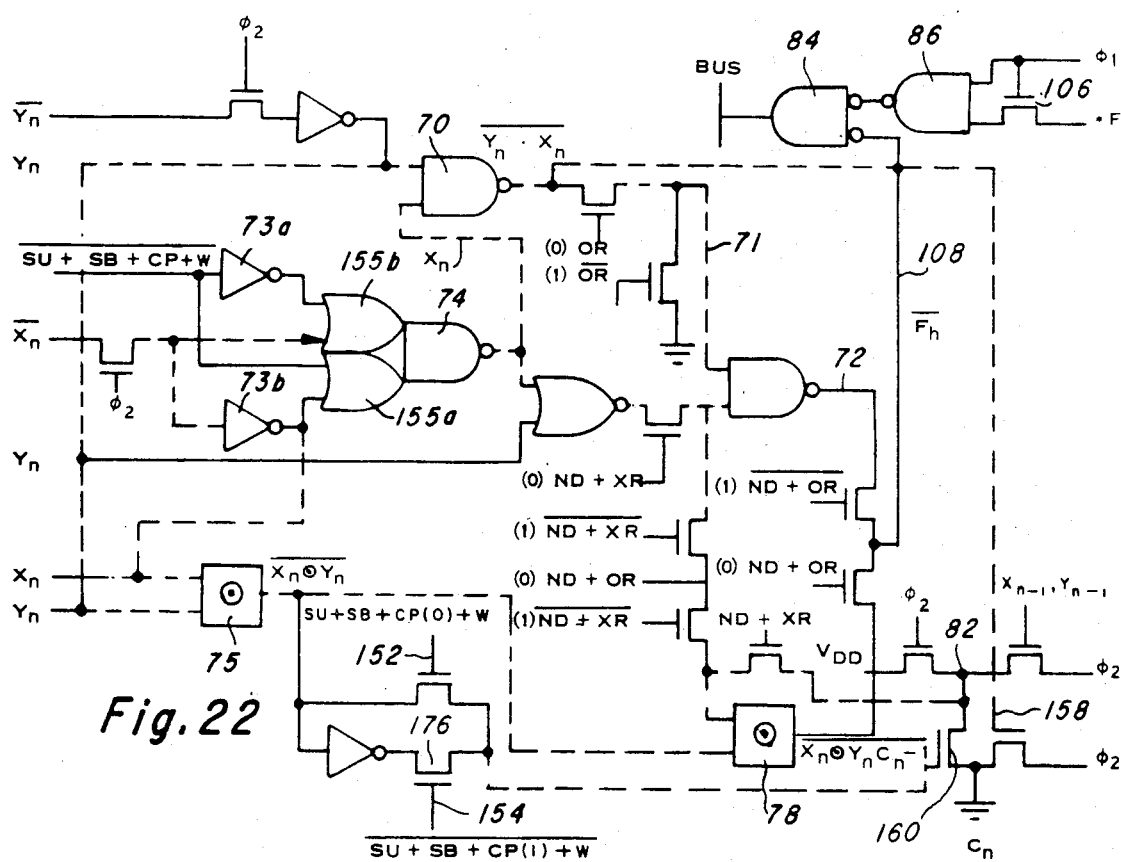
FIG. 22 is a logic diagram illustrating the arithmetic operation add.

With reference to FIG. 19 and U.S. Pat. No. 4,037,094, there is illustrated one bit of the arithmetic unit in logic form generally at 67A. The other seven bits of the arithmetic unit are shown in block diagram form at 67b through 67i. The arithmetic unit comprises inverters shown generally at 59, complex gates 61, NAND gates 60, NOR gates 62, ring dot gates 58 (which are the inverse of exclusive ORs) and transfer gates 63. These logic gates are interconnected such that in response to a preselected code in instruction bits $I_5$, $I_4$, and $I_3$, eight separate arithmetic operations may be effected. Operation of the logic in performing an add instruction is shown in FIG. 22. The logic associated with the subtract instruction and exclusive OR instructions are shown respectively in FIGS. 23 and 24.

With reference now to FIG. 22, description of the logic of one bit of the arithmetic logic unit in performing an add instruction will be described. If an add instruction is desired, the control signal 152 will be a logic 0. The signal is labelled SU+SB+CP+W. It will be recalled that this signal is generated by the arithmetic logic unit control circuit described previously with respect to FIG. 17 of U.S. Pat. No. 4,037,094. With reference to FIG. 17 of U.S. Pat. No. 4,037,094, it may be seen that if the instruction bits $I_5$, $I_4$, an $I_3$ are respectively 000, the code corresponding to add (reference Table V of U.S. Pat. No. 4,037,094) then the output of AND gate 96 will be a logic 0. Hence, the control signal 152 is 0 when an add instruction is desired. Similarly, the inverse of the control signal 152 labelled 154 in FIG. 22, is a logic 1.

Signal 154 is applied to the OR gate 155a and the inverter 73a. The output of the inverter 73a is applied to one input of the OR gate 155b. The input signal $\overline{X}_n$ which is outputted from the temporary storage register illustrated in FIG. 18 of U.S. Pat. No. 4,037,094, is applied directly to the other input of the OR gate 155b. The signal $\overline{X}_n$ is inverted by inverter 73b to produce the true signal $X_n$ which is applied to the other input of the OR gate 155a and also to an input of the ring gate 75. The logic 1 level of the control signal 154, i.e., $SU+SB+CP/$, enables operation of the arithmetic unit. The output of the NAND gate 74 will be bit $X_n$. For example, consider a situation where the bit $X_n$ from the temporary storage register such as 114 in FIG. 18 of U.S. Pat. No. 4,037,094, is a logic 1. For this situation, when the control signal 154 goes to a logic 1, the inputs to the OR gate 155b are logic 0 from the inversion 73a, and 0 from the signal $X_n$. This produces an output of the OR gate 155b of a logic 0, which forms one input to NAND gate 74. Further, one input to the OR gate 155a is a logic 1 corresponding to the control signal 154. The other input to the OR gate 155a is a logic 1 corresponding to the true value of the bit $\overline{X}_n$. This produces an output of the OR gate 155a of a logic 1, which is also an input to the NAND gate 74. Thus, NAND gate 74 has inputs of 0 and 1 corresponding to an output of a logic 1 which, in turn, is the logic level assumed for the bit $X_n$. In a similar manner, it may be shown that where the logic bit $X_n$ is 0, a logic 0 will be produced at the output of NAND gate 74.

The inverse of the exclusive or of bit $X_n$ and $Y_n$ will be formed by the circuit dot gate 75, one input of which is the signal $X_n$ taken from the output of the inverter 73b, and the true signal $Y_n$. The output of the the gate 75 is labelled $\overline{X_n \oplus Y_n}$. This output is part of the sum and carry of the sum $X_n$ and carry $C_n$. The carry will first be traced. The output of gate 70 will be the NAND sum of $X_n$ and $Y_n$. This output is shown as $\overline{X_n \cdot Y_n}$. If these bits $X_n$ and $Y_n$ are both logic 1, a carry must be generated. This is accomplished since logic 1, a carry must be generated. This is accomplished since logic 1 inputs to the NAND gate 70 effecting a logic 0 output which is effective to operate the transfer gate 158, generating a carry ($C_n$) signal since clock phase 2 is normally a logic 1 level. If a carry is not generated, then a carry may be propagated by the inverse of the exclusive or of $X_n$ or $Y_n$, shown at the output of gate 75. This occurs because the output $\overline{X_n \oplus Y_n}$ is transferred through gate 176 to logic gate 160. The carry will be propagated from node 92 through gate 160 to the next bit $C_n$. The input to gate 82 will be either $C_{n-1}$ or a generate from the NAND term $X_{n-1}$ and $Y_{n-1}$.

The sum $F_n$ is expressed as $F_n = X_n \oplus Y_n + C_{n-1}$; $C_n = X_n \cdot Y_n + C_{n-1}(X_n \oplus Y_n)$. The sum $F_n$ will be generated through the inverse exclusive OR gate 78 and will be the exclusive or of the carray $C_{n-1}$ and exclusive or or $X_n$ or $Y_n$. The sum term at the output of gate 78 generates the bus if a *F occurs for the time frame at NAND gate 86.

Figure 23:
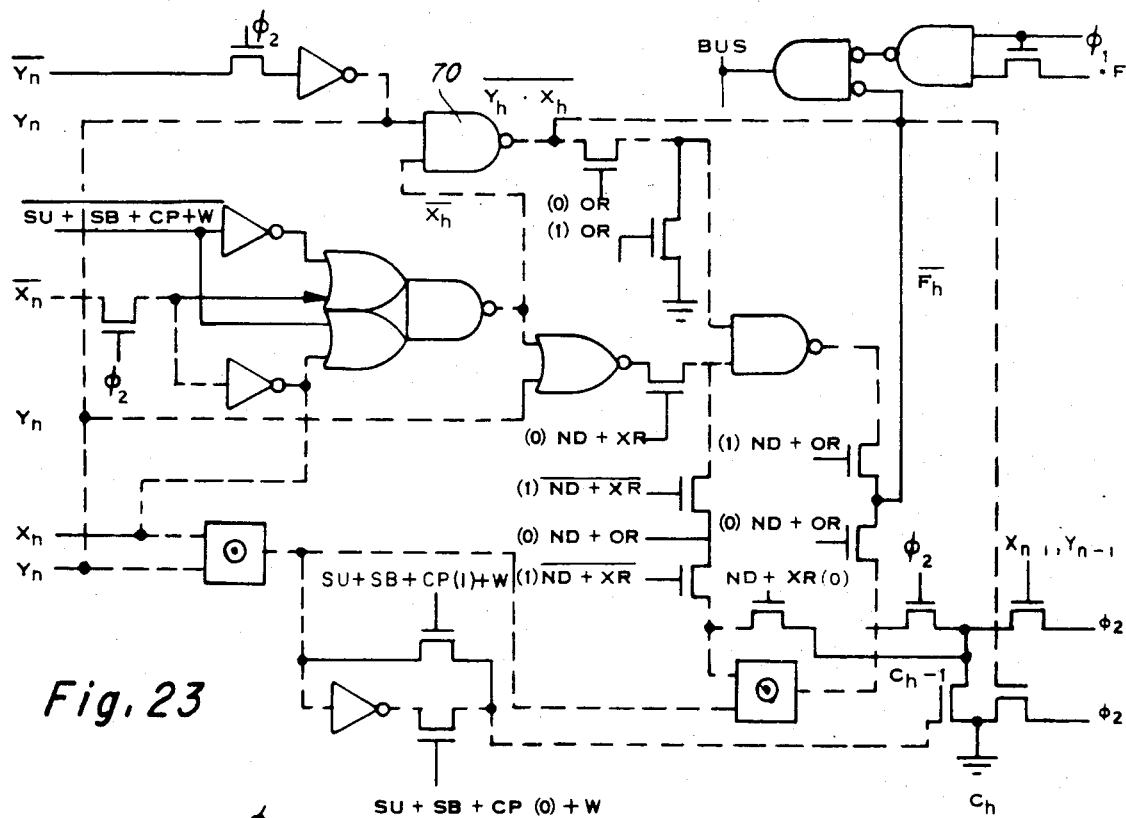
FIG. 23 is a logic diagram illustrating the arithmetic logic for subtract.

FIG. 23 shows the operation of the ALU logic to effect subtraction. As may be seen from the sum term $F_n = X_n \oplus Y_n \oplus C_{n-1}$, the difference is the same for subtract as add. The only difference between operation of the two circuits is that the $X_n$ input to the carry equation is inverted. This may be seen at the output of the NAND gate 70, where the output is shown as $\overline{Y_n \cdot X_n}$. Otherwise, operation of the subtract logic is the same as for add as described with reference to FIG. 22.

Figure 24:
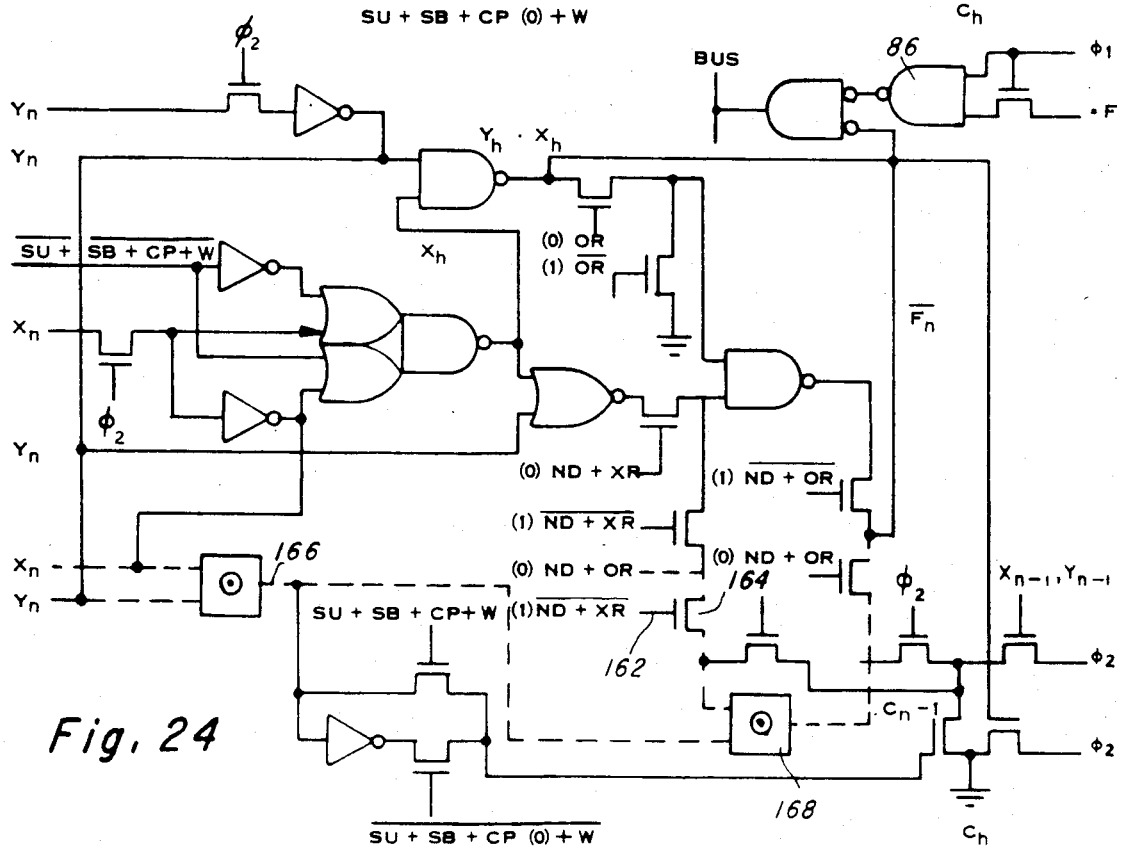

With respect to FIG. 24, operation of an exclusive or instruction will be described. For this example, the sum $F_n$ is equal to $X_n Y_n$. For an exclusive or operation, the signal XR must be a logic 1. This signal will be generated when the instruction bits $I_3$, $I_4$, and $I_5$ are respectively 101. (Reference Table V of U.S. Pat. No. 4,037,094). With reference back to FIG. 17 of U.S. Pat. No. 4,037,094, it may be seen that such a coding for instruction register bits $I_3$, $I_4$, and $I_5$ will produce a logic 1 at output of the NAND gate 96a, producing an output signal XR that is a logic 1. The signal $\overline{ND+XR}$ is applied to the transfer gate 164. This signal will be a logic 0 when the signal "ND+XR+W" is a logic 1. The transfer gate 164 will be activated by the signal 162 such that a logic 1 is transferred to the input of gate 168. The signal 166 is the inverse of exclusive or of the two arms $X_n$ and $Y_n$. The inverse of this exclusive or will be combined with the logic 1 present at the input of gate 168. The output of gate 168 forms the exclusive or of the terms $X_n$ and $Y_n$. This output will be gated onto the bus when the control signal *F is a logic 1 at the NAND gate 86.

In a similar manner, the logic associated with the arithmetic operations may be traced through the logic of the arithmetic unit.

A complete description of the invention is in my U.S. Pat. No. 4,037,094 which is incorporated herein by reference.

What is claimed is:

1. A computing system having an arithmetic logic unit for performing arithmetic and logic operations in response to coded instructions, said computing system comprising in combination:
   a single semiconductor integrated circuit device containing said arithmetic logic unit and terminals for connecting external devices to the integrated circuit device;
   addressable memory means external to said integrated circuit device for storing said coded instructions;
   input/output means external to said integrated circuit device;
   bus means external to said integrated circuit device and connecting said terminals to said addressable memory means and said input/output means;
   said integrated circuit device including:
   (a) decode means for receiving said coded instructions and providing a plurality of sets of output control signals respectively corresponding to the arithmetic and logic operations that can be performed by the computing system;
   (b) said arithmetic logic unit comprising single logic circuit means for receiving said plurality of sets of control signals and selectively effecting arithmetic and logic operations corresponding to the selected operations;
   (c) said arithmetic logic unit further including input means to receive data for operation by the logic circuit means and output means from which the result of the selected operation on such data is available;
   (d) input selection means associated with said input means and responsive to said control signals to select input data to be applied to said logic circuit means;
(e) a plurality of data storage means for storing data for selective coupling by said input selection means to said input means and for receiving said result from said output means;
(f) means for coupling an address from said data storage means to said terminals for connection to said addressable memory means by said bus means;
(g) means for coupling a coded instruction from said terminals to said decode means.

2. A computing system including an arithmetic logic unit as set forth in claim 1 wherein said logic circuit means comprises a plurality of insulated gate field effect transistors interconnected to perform the arithmetic and logic operations add, add with carry, subtract, subtract with borrow, AND, OR, EXCLUSIVE OR, and COMPARE.

3. A computing system as set forth in claim 2 wherein said transistors of said logic circuit means define:
a first complex gate connected to receive control signals from said decode means and inverting the subtrahend in a subtraction operation,
a first logic gate coupled to the output of said first complex gate for performing an AND operation and for forming a carry generate signal;
a second logic gate connected to the output of said first complex gate for effecting an OR logic operation;
a first Exclusive OR gate coupled to said second logic gate and said first complex logic gate for generating the exclusive OR function and for generating a carry propagate term;
a third logic gate coupled to the output of said first logic gate and said second logic gate for controlling the outputs of the logic OR and AND functions;
a second Exclusive OR gate coupled to the output of said second logic gate and the output of said first Exclusive OR gate for controlling generation of the exclusive or function and for forming the sum output of the associated bit of the arithmetic logic unit;
and a carry circuit coupled to said first logic gate for generating a carry within a bit of the arithmetic logic unit and for propagating a carry between bits of the arithmetic logic unit for addition and subtraction operations.

4. A digital processor system comprising: an arithmetic logic unit for performing a plurality of different arithmetic and logic operations in response to coded instructions, the arithmetic logic unit being formed in a single semiconductor integrated circuit device; a parallel bus connected to the device; memory means external to the device coupled to the parallel bus; the arithmetic logic unit including:
(a) decode means for receiving in parallel said coded instructions from said memory means via said parallel bus and providing a plurality of different sets of multi-bit parallel control signals, each set respectively corresponding to a different one of the arithmetic and logic operations that can be performed by the system;
(b) logic circuit means for receiving said plurality of sets of parallel control signals, one set at a time, and executing the selected arithmetic/logic operations corresponding to the coded instructions, the logic circuit means also having two multi-bit inputs for receiving parallel data inputs from two seperate sources on the device, at least one of said sources being loaded from said memory via said parallel bus, the logic circuit means producing a parallel multi-bit output representing the selected operation on the data inputs, the output being stored on the device; and
(c) temporary storage means on the device for saving a plurality of status bits, including at least a carry bit defined by a carry produced from operation of the arithmetic logic unit and a zero bit defined by all zeros produced from operation of the arithmetic logic unit.

5. A digital processor system comprising: an arithmetic logic unit for performing a plurality of different arithmetic and logic operations in response to coded instructions, the arithmetic logic unit being formed in a single semiconductor integrated circuit device; memory means separate from said device; peripheral input/output apparatus seperate from said device; parallel bus means connected to the memory, to the input/output apparatus and to the device; the arithmetic logic unit including:
(a) decode means for receiving in parallel said coded instructions from said parallel bus means and providing a plurality of different sets of multi-bit parallel control signals, each set respectively corresponding to a different one of the arithmetic and logic operations that can be performed by the system;
(b) logic circuit means for receiving said plurality of sets of parallel control signals, one set at a time, and executing the selected arithmetic/logic operations corresponding to the coded instructions, the logic circuit means also having two multi-bit inputs for receiving parallel data inputs from two separate sources on the device, at least one of said sources being loaded from said parallel bus means, said logic circuit means producing a parallel multi-bit output representing the selected operation on the data inputs, the output being stored on the device; and
(c) temporary storage means on the device for saving a plurality of status bits, including at least a carry bit defined by a carry produced from operation of the arithmetic logic unit and a zero bit defined by all zeros produced from operation of the arithmetic logic unit.

6. A digital processor system according to claim 5 wherein at least one of said status bits from said temporary storage means is an input to said decode means.

7. A digital processor system according to claim 5 wherein at least one of said status bits from said temporary storage means is an input to said logic circuit means.

8. A computing system comprising: a CPU chip with an arithmetic logic unit for performing a plurality of different arithmetic and logic operations in response to coded instructions, the CPU chip with said arithmetic logic unit being a single-chip semiconductor integrated circuit device; memory means separate from said device; peripheral input/output system interface apparatus separate from said device; parallel bus means connected to the memory, to the input/output interface apparatus and to the device; the CPU chip with arithmetic logic unit inlcuding:

(a) clocking means for establishing repetitive state times during which the arithmetic logic unit executes operations;

(b) decode means for receiving in parallel one of said coded instructions from said parallel bus means in a first state time and producing a sequence of different sets of multi-bit parallel control signals, each set being produced in a state time following said first state time, the sequence corresponding to one of the arithmetic and logic operations performed by the system; and (c) logic circuit means in the arithmetic logic unit for receiving said sequence of sets of parallel control signals, one set at a time, and executing a sequence of arithmetic/logic operations defined thereby, one in each state time, the logic circuit means also having two multi-bit inputs for receiving parallel data inputs from two separate sources on the device, at least one of said sources being loaded from said parallel bus means, the logic circuit means producing a parallel multi-bit output representing the defined operation executed upon the data inputs, the output being stored on the device.

9. A computing system according to claim 8 including temporary storage means on said device for saving a plurality of status bits including at least a carry bit and a zero bit, the carry bit being defined by a carry produced from operation of said arithmetic logic unit in a given state time and the zero bit being defined by all zeros produced from operation of said arithmetic logic unit in a given state time, at least one of the status bits from the temporary storage means being an input to the decode means or the logic circuit means in a state time after the given state time.

10. A computing system according to claim 8 wherein at least one of said status bits from said temporary storage means is an input to said decode means.

11. A computing system according to claim 8 wherein at least one of said status bits from said temporary storage means is an input to sad logic circuit means.

12. A computing system having an arithmetic logic unit for performing arithmetic and logic operations in response to coded instructions, the computing system comprising in combination:

a single semiconductor integrated circuit device containing said arithmetic logic unit and terminals for connecting external devices to the integrated circuit device;

addressable memory means external to said integrated circuit device for storing said coded instructions;

input/output means external to said integrated circuit device;

external bus mens separate from said integrated circuit device and connecting said terminals to said addressable memory means and said input/output means;

said integrated circuit device including:
(a) internal bus means coupled to said terminals;
(b) an instruction register coupled to said internal bus means to receive the coded instructions;
(c) decode means coupled to said instruction register for receiving said coded instructions and providing a plurality of sets of output control signals respectively corresponding to the arithmetic and logic operations that can be performed by the computing system;

(d) single logic circuit means included in the arithmetic logic unit for receiving said plurality of sets of control signals and selectively effecting arithmetic and logic operations corresponding to the selected operations;

(e) ALU input means to receive data for operation by the logic circuit means of the arithmetic logic unit; and ALU output means from which the result of the selected operation on such data is available;

(f) input selection means included in said ALU input means and responsive to said control signals to select ALU input data to be applied to said logic circuit means;

(g) data storage means including a plurality of addressable locations for storing data, said data storage means being selectively coupled to said internal bus means, and means for selectively coupling said input selection means to said internal bus means to thereby selectively couple said ALU input means to receive data from the data storage means, and means for selectively coupling said ALU output means to said internal bus means whereby said data storage means selectively recieves said result from said ALU output means;

(h) means for coupling an address from said data storage means via said internal bus means to said terminals for connection to said addressable memory means by said external bus means.

13. A computing system according to claim 12 wherein said addressable memory means includes both read/write memory for storing data and read-only memory for storing said coded instructions.

14. A computing system according to claim 13 including means for selectively coupling said ALU input means to said terminals, under control of said coded instructions and via said input selection means.

15. A computing system conprising:
(A) a single semiconductor integrated circuit device containing a multifunctional arithmetic logic unit and having terminals for connecting external devices to the integrated circuit device; said arithmetic logic unit performing a plurality of different arithmetic and logic operations in response to coded instructions;

(B) addressable memory means external to said integrated circuit device for storing said coded instructions;

(C) external bus means separate from said integrated circuit device and connecting said terminals to said addressable memory means;

(D) said integrated circuit device including:
(a) internal bus means coupled to said terminals;
(b) an instruction register coupled to said internal bus means to receive the coded instructions;
(c) decode means coupled to said instruction register for receiving said coded instructions and providing a plurality of different sets of output control signals some of which respectively correspond to the arithmetic and logic operations performed by the arithmetic logic unit in response to said coded instructions;
(d) multifunctional logic circuit means included in the arithmetic logic unit for receiving control signals from said decode means and performing said arithmetic and logic operations corresponding to said coded instructions;

(e) ALU input means receiving data for operation upon by the logic circuit means of the arithmetic logic unit, and ALU output means from which the result of the selected operation by the arithmetic logic unit on such data is available;

(f) input selection means included in said ALU input means and responsive to said output control signals to select ALU input data to be applied to said ALU input means;

(g) data storage means including a plurality of addressable locations for storing data, means for selectively coupling selected locations of said data storage means via said input selection means and internal bus means to said ALU input means, and means for selectively coupling said result from said ALU output means to a location of said data storage means;

(h) means for coupling an address from said data storage means via said internal bus means to said terminal for connection to said addressable memory means by said external bus means to select a coded instruction, and means for coupling such coded instruction selected from said addressable memory means from said terminals via said internal bus means to said instruction register.

16. A computing system according to claim 15 wherein said addressable memory means includes both read/write memory for storing data and read-only memory for storing said coded instructions.

17. A computing system according to claim 16 wherein one of said pair of ALU inputs, under control of said output control signals corresponding to said coded instructions coupled to said input selection means, selectively receives data either from said data storage means, or the read/write memory, or the read-only memory.

18. A computing system according to claim 15 wherein said integrated circuit device includes:
clocking means having outputs coupled to said arithmetic logic unit, to said internal bus means, to said decode means, to said input selection means, and to said data storage means; said clocking means establishing repetitive state times; said arithmetic logic unit performing one of said operations during a state time.

19. A computing system according to claim 15 wherein said integrated circuit device includes:
temporary storage means for saving a plurality of status bits incuding at least a carry bit and zero bit, the carry bit being produced by operation of said arithmetic logic unit upon data, the zero bit being produced by operation of said arithmetic logic unit upon data whereby said ALU output is all zeros.

* * * * *